(12) United States Patent
Chen

(10) Patent No.: US 8,538,070 B2
(45) Date of Patent: Sep. 17, 2013

(54) MOTION DETECTING METHOD AND APPARATUS THEREOF

(75) Inventor: Wen-Jyh Chen, Hsin Chu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 1176 days.

(21) Appl. No.: 12/180,081

(22) Filed: Jul. 25, 2008

(65) Prior Publication Data

US 2009/0028391 A1 Jan. 29, 2009

(30) Foreign Application Priority Data

Jul. 26, 2007 (TW) .............................. 96127202 A

(51) Int. Cl.
*G06K 9/00* (2006.01)
(52) U.S. Cl.
USPC ............ 382/103; 382/107; 348/154; 348/155
(58) Field of Classification Search
USPC ........................... 382/103, 107; 348/154, 155
See application file for complete search history.

(56) References Cited

U.S. PATENT DOCUMENTS

| 4,786,963 | A |   | 11/1988 | McNeely et al. |  |
|---|---|---|---|---|---|
| 5,032,914 | A |   | 7/1991 | Fujita |  |
| 5,103,297 | A |   | 4/1992 | Yamade |  |
| 5,410,356 | A | * | 4/1995 | Kikuchi et al. | ............... 348/452 |
| 5,430,500 | A |   | 7/1995 | Hoshino et al. |  |
| 5,625,421 | A | * | 4/1997 | Faroudja et al. | ............. 348/607 |
| 5,786,872 | A |   | 7/1998 | Miyazaki et al. |  |
| 5,909,255 | A |   | 6/1999 | Hatano |  |
| 6,133,957 | A |   | 10/2000 | Campbell |  |
| 6,188,445 | B1 |   | 2/2001 | Taketani |  |
| 6,421,090 | B1 |   | 7/2002 | Jiang et al. |  |
| 6,774,954 | B1 |   | 8/2004 | Lee |  |
| 6,795,126 | B1 |   | 9/2004 | Lee |  |
| 7,274,408 | B2 | * | 9/2007 | Shan et al. | ..................... 348/669 |
| 2006/0110058 | A1 |   | 5/2006 | Chao |  |
| 2006/0197877 | A1 |   | 9/2006 | Chao |  |
| 2006/0222267 | A1 |   | 10/2006 | Chao |  |
| 2007/0008432 | A1 | * | 1/2007 | Chen et al. | ..................... 348/702 |
| 2007/0153123 | A1 | * | 7/2007 | Pan et al. | ....................... 348/452 |
| 2007/0263905 | A1 |   | 11/2007 | Chang et al. |  |

* cited by examiner

*Primary Examiner* — Matthew Bella
*Assistant Examiner* — Julian Brooks
(74) *Attorney, Agent, or Firm* — McClure, Qualey & Rodack, LLP

(57) ABSTRACT

The invention discloses motion detecting method and apparatus thereof. The method and apparatus are utilized to detect a motion condition of a target pixel. The motion detecting method comprises the following steps: receiving a composite signal including a target frame and a reference frame; selecting a first reference pixel from the target frame and selecting a second reference pixel and a third reference pixel from the reference frame; generating a first signal according to the pixel values of the target pixel and the first reference pixel; calculating a first difference between the target pixel and the first reference pixel and a second difference between the second reference pixel and the third reference pixel, and generating a second signal according to the first difference and the second difference; selecting a plurality of first pixels from the target frame and a plurality of second pixels from the reference flame, according to the target pixel, wherein the second pixels correspond to the first pixels; generating a third signal according to the averaged value of the first pixels and the averaged value of the second pixels; and determining a motion condition of the target pixel according to the first signal, the second signal, and the third signal.

22 Claims, 7 Drawing Sheets

MOTION DETECTING METHOD AND APPARATUS THEREOF

BACKGROUND OF THE INVENTION (a) Field of the Invention

The present invention relates to an image processing method, and more particularly, to an image motion detecting method.

(b) Description of the Related Art

In general, image data are transmitted via a composite signal. The composite signal includes luminance information and chrominance information where the chrominance information is appended on to the luminance information through modulating the high frequency part of the luminance information.

Therefore, after receiving the composite signal, a video decoder has to separate out the luminance information and the chrominance information for subsequent image processing operations. Such separating operation is called luminance/chrominance separation (Y/C separation).

As is known by those who are skilled in the art, the Y/C separation can be classified into three categories. They are the 2D Y/C separation, the 3D Y/C separation, and the combinational 2D and 3D Y/C separation that lies in between the above two methods.

As the name implies, the 2D Y/C separation is performed by referencing to the 2D information. In other words, the 2D Y/C separation is performed according to the relation between each pixel and its neighboring pixels in the same picture (frame). The 2D Y/C separation is generally utilized in a motion image. This is because differences exist between any two pictures in the motion images. Therefore, if the corresponding pixels of different pictures are utilized as references for the Y/C separation, the processed images will have distortions.

The 3D Y/C separation is performed by referencing to the 3D information. In other words, the 3D Y/C separation is performed according to the mutual relationships between the corresponding pixels in different pictures (frames). The 3D Y/C separation is generally utilized in a still image. This is because the corresponding pixels in different pictures of a still image basically have the same pixel values, such as the luminance value and chrominance value. Therefore, a simple 3D filtering operation (for example: an averaging operation) can be performed to recover the luminance value and the chrominance value correctly.

And, another separating operation that lies in between the 2D and the 3D Y/C separating operations is the combinational 2D and 3D Y/C separation. Such operation determines the weights (allocated proportion) of the 2D Y/C separation and the 3D Y/C separation according to the motion condition (such as: the extent of still) of an image. Thus, the Y/C separation can also be achieved by the combinational separating operation.

From the above descriptions, it can be seen that those who are skilled in the art need to use different Y/C separating operation to process an image according to the property of the image such that the image quality could be maintained. In other words, before an appropriate category of the above-mentioned three Y/C separations is selected, the property of the image (that is, the above-mentioned image motion condition) should be detected first. Then, an appropriate Y/C separating operation can be selected according to the motion condition of the image after the motion condition of the image is determined.

However, it is not easy to correctly determine the motion condition of the image. For example, because the image signal is often interfered by noises, it is sometimes hard to distinguish whether a detected high frequency phenomenon comes from the property of the image itself or the noise interferences while performing motion detection on the image. From the above description, it can be seen that the selection of the Y/C separation method is directly influenced such that the quality of the processed image becomes worse when the motion condition of the image is incorrectly determined. For example, if the still portion of an image is determined as having motions, the 2D Y/C separating operation is thus selected to process the image. Then, the boundary of an object or the line edges shown in the image may be blurred and the cross-color phenomenon may occur.

Therefore, the image motion detecting method becomes an important topic of the image processing method.

BRIEF SUMMARY OF THE INVENTION

Therefore, one object of the invention is to provide an image motion detecting method and apparatus thereof for generating more proper motion information of an image. Thus, the result of the subsequent luminance/chrominance separation can match the property of the image to reduce the image distortion and solve the problems in the prior art.

According to an embodiment of the present invention, a motion detecting method is disclosed. The motion detecting method comprises the following steps: receiving a composite signal including a target frame and a reference frame; for a target pixel of the target frame, selecting a first reference pixel from the target frame and selecting a second reference pixel and a third reference pixel from the reference frame, wherein the first reference pixel and the target pixel locate at a target scanning line, and the locations of the second reference pixel and the third reference pixel correspond to the locations of the target pixel and the first reference pixel, respectively; generating a first signal according to the pixel values of the target pixel and the first reference pixel; calculating a first difference between the target pixel and the first reference pixel and a second difference between the second reference pixel and the third reference pixel, and generating a second signal according to the first difference and the second difference; selecting a plurality of first pixels from the target frame and a plurality of second pixels from the reference frame, according to the target pixel, wherein the second pixels correspond to the first pixels; generating a third signal according to the averaged value of the first pixels and the averaged value of the second pixels; and determining a motion condition of the target pixel according to the first signal, the second signal, and the third signal.

According to another embodiment of the present invention, a motion detecting method is disclosed. The motion detecting method comprises the following steps: receiving a composite signal including at least a target frame and a reference frame; for a target pixel of the target frame, selecting a first subset of a target scanning line, which the target pixel locates on, from the target frame and selecting a second subset from the reference frame, wherein the second subset corresponds to the first subset; comparing a pixel value variation condition of the first subset with a pixel value variation condition of the second subset to generate a first signal; comparing an weighted average of pixel values of the first subset with an weighted average of pixel values of the second subset to generate a second signal; and determining a motion condition of the target pixel according to the first signal and the second signal.

According to another embodiment of the present invention, an apparatus for motion detection of a target pixel of a target scanning line in a target frame is disclosed. The apparatus comprises: a calculating module for generating at least one calculating signal according to the target pixel, a plurality of first pixels including a first reference pixel in the target frame and a plurality of second pixels including a second reference pixel and a third reference pixel in a reference frame; and a determining module for determining a motion condition of the target pixel according to the at least one calculating signal; wherein the locations of the target pixel and the first reference pixel correspond to the locations of the second reference pixel and the third reference pixel, respectively, and the at least one calculating signal is related to the sign of the target pixel, the first pixels, and tile second pixels.

DETAILED DESCRIPTION OF THE INVENTION

In the following disclosure, for the convenience of illustrating the present invention, the image motion detecting method according to the present invention is utilized in an NTSC image system. However, the NTSC image system is regarded as just one example according to the present invention and should not be construed as any limitation on the scope of the invention.

As is known by those who are skilled in the art, in the NTSC image system, a RGB image signal is first converted into a YUV image signal and the chrominance and the luminance information is modulated into a composite signal while transmitting the signal. As mentioned previously, the chrominance signal is appended in the high frequency part of the luminance signal. The composite signal can be represented by the following equation:

$$\text{Composite signal} = Y + U \sin(wt) + V \cos(wt)$$

where the Y represents the luminance signal and the U, V represent the chrominance signals.

Figure 1:
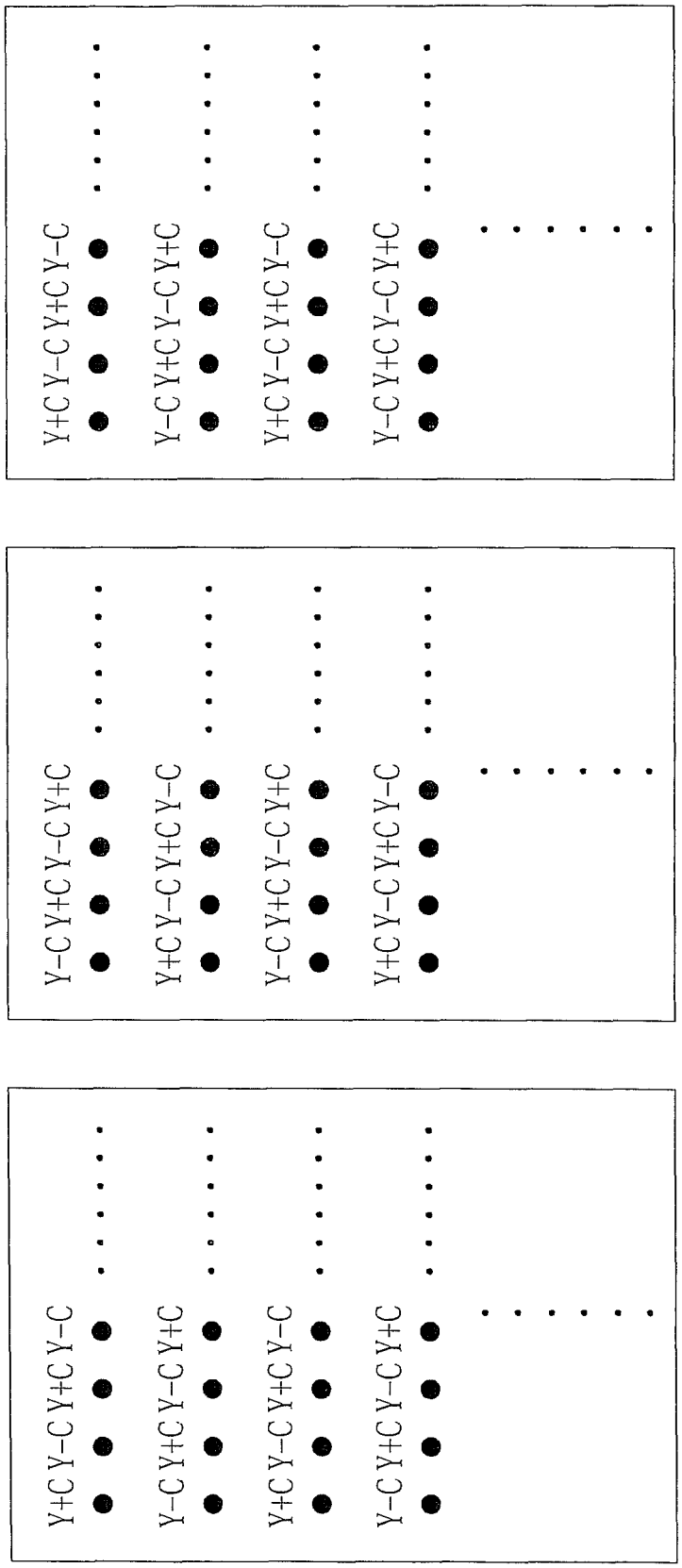
FIG. 1 shows a schematic diagram illustrating three neighboring pictures (frames) F1, F2, and F3 of an NTSC image system.

Please refer to FIG. 1 which shows a schematic diagram illustrating three neighboring pictures (frames) F1, F2, and F3 of an NTSC image system. Since a carrier is carried in the chrominance information and it is defined in NTSC image system that the chrominance phases between any two successive scanning lines are reversed (180 degrees phase difference), the chrominance phases of two successive scanning lines of every frame are reversed as shown in FIG. 1. In addition, because a frame generally has 525 scanning lines, the chrominance phases of two scanning lines corresponding to the same position of two successive frames also have 180 degrees phase difference, similar to that shown in FIG. 1.

Based on the above-mentioned principle, in FIG. 1, each pixel is labeled as Y+C or Y−C where the Y is tile luminance information of the pixel and the C is the chrominance information of the pixel (that is, the above-mentioned U and V). As shown in FIG. 1, the chrominance phases of the first frame and the third frame are the same in the NTSC image system. In fact, as long as two frames are separated by an odd number of frames, the chrominance phases of the two frames will be the same, and the chrominance phases of the two frames will be reversed to each other if the two frames are adjacent mutually or separated by an even number of frames.

Therefore, in theory, for two frames having the same chrominance phases, the values of the pixels in the two frames are influenced by the chrominance phases in the same way. In other words, if an image is a still image, the pixel values are theoretically the same in the frames having the same chrominance phases (e.g., tile first flame F1 and the third frame F3, shown in FIG. 1).

Moreover, even if the composite signal of a still picture (or a still portion of a picture) is interfered by noises, the luminance chrominance value of most pixels of the image will vary slightly instead of changing violently.

The present invention utilizes the above-mentioned characteristics to perform the image motion detection. The detailed principles and operations will be illustrated in the followings.

Figure 2:
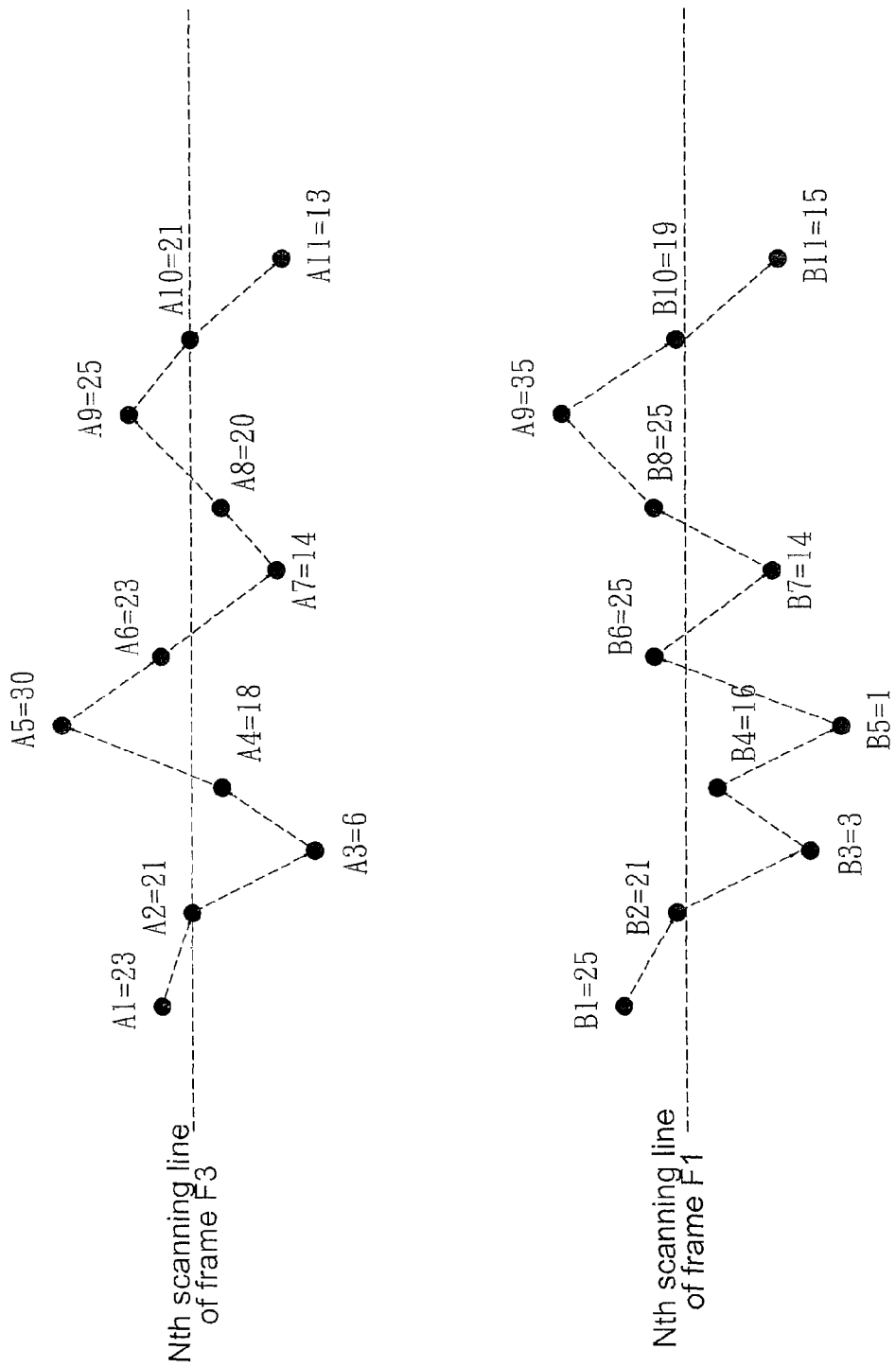
FIG. 2 shows a simplified schematic diagram illustrating the corresponding scan lines of the two frames having the same chrominance phase.

Please refer to FIG. 2 which shows a simplified schematic diagram illustrating the corresponding scanning lines of two frames having the same chrominance phase (such as the frame F1 and the frame F3, shown in FIG. 1). For brevity, as shown in FIG. 2, only 11 pixels (A1~A11, B1~B11) are illustrated in a single scanning line and the corresponding pixel values are also shown.

The principle of the motion detection according to the present invention is illustrated as follows:

For the corresponding scanning lines of two frames (that is, the scanning lines corresponding to the same positions, such as the $N^{th}$ scanning line), if tile picture corresponds to a still image, the two scanning lines will have the following characteristics:

1. The pixel value variation conditions for each pixel in tile two scanning lines are very similar. In this embodiment, the pixel value variation condition includes the variation amount and the variation direction of the pixel value. For example, when comparing the pixel value variation conditions of the A4~A6 and the B4~B6 pixels, the pixel value variation condition of the pixels A4~A6 is regarded as being different from that of the pixels B4~B6 because the differences between two neighboring pixels have different signs. On tile other hand, for the pixels A7~A11 and B7~B11, although tile variation direction of the pixel values of the pixels A7~A11 and that of the pixels B7~B11 are almost the same, the values of the differences between pixels are large (for example, tile A10~A9=−4 but the B10~B9=−16) and thereby the pixel value variation condition of the pixels A7~A11 is regarded as being different from that of the pixels B7·B11. As shown in FIG. 2, only the pixels A1~A4 and the pixels B1~B4 comply with the above-mentioned requirements and thus have similar pixel value variation conditions.

2. The averages of the signals should be similar. Similar averages represent that the luminance are similar. A still image should comply with the above-mentioned characteristics. Even though the signal is influenced by noises, the influence upon the average value is not very apparent. Therefore, as shown in FIG. 2, the present invention can compare the average of pixels A1—A11 with that of the pixels B1~B11 to detect whether the difference between the averages is within an acceptable range or not.

Figure 3A:
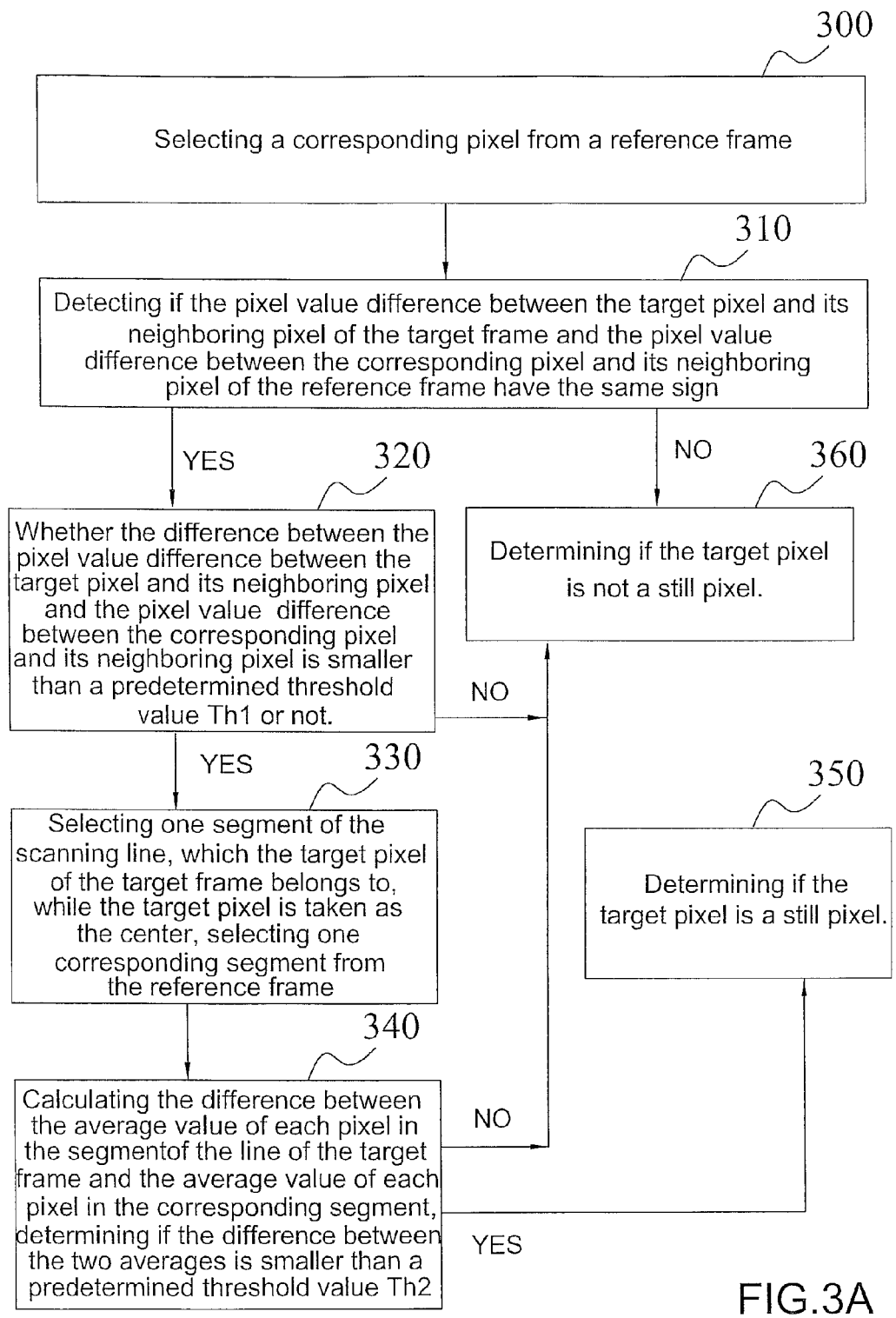
FIG. 3A shows a flow chart of the method according to one embodiment of tile present invention.

Please refer to FIG. 3A which shows a flow chart illustrating the method according to one embodiment of the present invention. It comprises following steps:

Step 300: for a target pixel of a target frame, selecting a corresponding pixel from a reference frame. (The frame F3 and the frame F1 shown in FIG. 1 represent the target frame and the reference flame, respectively, according to this embodiment. But, the invention should not be limited to the specific construction and arrangement.);

Step 310: detecting if the pixel value difference between the target pixel and its neighboring pixel of the target frame and the pixel value difference between the corresponding pixel and its neighboring pixel of the reference frame have the same sign, and then moving on to the Step 320 if yes, and jumping to the Step 360 if not;

Step 320: detecting whether the difference between the above-mentioned pixel value difference between the target pixel and its neighboring pixel and the above-mentioned pixel value difference between the corresponding pixel and its neighboring pixel is smaller than a predetermined threshold value Th1 or not, and then moving on to the Step 330 if yes, and jumping to the Step 360 if not;

Step 330: selecting one segment of the scanning line, which the target pixel of the target frame belongs to, while the target pixel is taken as the center, selecting one corresponding segment from the reference frame, and then moving on to the Step 340;

Step 340: calculating the difference between the average value of each pixel in the segment of the line of the target frame and the average value of each pixel in the corresponding segment, determining if the difference between the two averages is smaller than a predetermined threshold value Th2, and then moving on to the Step 350 if yes, and jumping to the Step 360 if not;

Step 350: determining if the target pixel is a still pixel; and

Step 360: determining if the target pixel is not a still pixel.

Figure 3B:
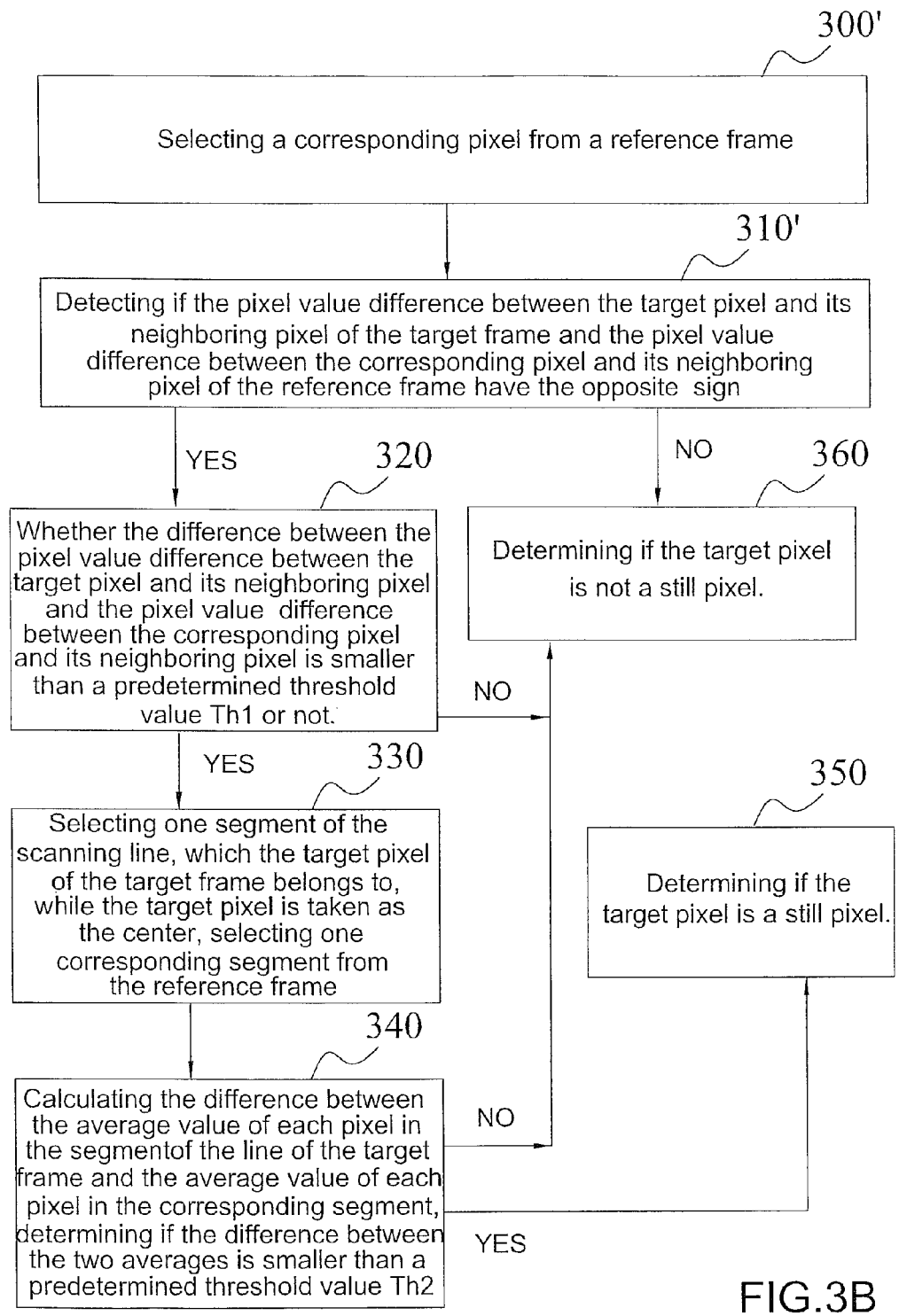
FIG. 3B shows a flow chart of the method according to another embodiment of the present invention.

Please refer to FIG. 3B, contrary to the above-mentioned embodiment, two adjacent frames are adopted as the target frame and the reference frame (not shown), the step 300 and step 310 will be modified as following:

Step 300': for a target pixel of a target frame, selecting a corresponding pixel from a reference frame.

Step 310': detecting if the pixel value difference between the target pixel and its neighboring pixel of the target frame and the pixel value difference between the corresponding pixel and its neighboring pixel of the reference frame have the opposite sign, and then moving on to the Step 320 if yes, and jumping to the Step 360 if not.

It should be noted that the motion detecting operation according to the present invention is a pixel-based operation. In other words, the motion detection is performed pixel by pixel sequentially according to the present invention instead of determining the motion property of an image region at a time.

First, for a pixel (the target pixel) of a target frame (for example the frame F3) to be processed, a reference pixel of a reference frame (for example the frame F1) must be obtained initially to assist the determination of the motion condition of the target pixel (Step 300) in the subsequent operations. The example shown in FIG. 2 is described in the following.

Assuming that the target pixel is A2, a corresponding pixel B2 must be obtained from the reference frame (Step 300). Then, the relationship between the target pixel A2 and the corresponding pixel B2 will be detected according to one embodiment of the present invention. For example, the present invention detects if the target pixel and the reference pixel have the same pixel value variation condition.

Therefore, the present invention calculates the pixel value difference between A2 and A3 (or A1) and the pixel value difference between B2 and B3 (or B1), and then detects the two pixel value differences have the same sign (Step 310). As above mentioned, if the two pixel value differences are of the same sign, the two pixels may have the same variation conditions and the difference between the two pixel value differences will then be calculated (Step 320). If the difference is smaller than a predetermined threshold value Th1, it is determined that the variation condition of the target pixel A2 and the reference pixel B2 are the same.

Then, talking the target pixel A2 as the center, the present invention obtains one segment (for example, A1~A3) of the scanning line, which the target pixel A2 belongs to, and one corresponding segment (B1~B3) from the reference frame (Step 330). As above mentioned, the pixel average value for each pixel in the two segments is calculated. Tile difference of the two pixel average values is calculated and the difference is compared with another predetermined threshold value Th2 (Step 340).

Now, if the difference of the two pixel average values is also smaller than the predetermined threshold value Th2, it indicates that the target pixel A2 fits tile above-mentioned principle. Thus, the target pixel A2 is considered as a still pixel (Step 350).

On the other hand, if the situation that does not comply with the predetermined condition happens in any of the steps 310, 320 and 340, the target pixel is regarded as a motion image to avoid misjudging the motion image as the still image.

For example, as the target pixel is A5, the difference between A5 and A4 and the difference between B5 and B4 are of different sign. Then the condition of Step 310 is not met. Hence, the target pixel A5 is regarded as a motion image.

On the other hand, as the target pixel is A10, the difference between the pixel value difference between A10 and A9 and the pixel value difference between B10 and B9 is too large (exceeding the predetermined threshold value). Then, the condition of Step 320 is not met. Hence, the target pixel A10 is regarded as a motion image.

It should be noted that the invention does not limit the position of the neighboring pixel. For example, as the target pixel is A2, the neighboring pixel need not be A1 or A3. However, if the neighboring pixel is A1, the neighboring pixel of the reference pixel B2 must be the corresponding pixel, B1.

Besides, there is also no limitation on the length of the segment according to the present invention. The segment in the above mentioned embodiment of the present invention is composed of three pixels (A1~A3). However, it should not be construed as any limitation on the scope of the invention. In practical applications, the segment can be composed of more pixels, such as 5, 7 or more pixels. Such equivalent modifications or changes are also encompassed by the scope of the present invention.

It should be noted that the sequence of the above-mentioned steps is just one example and should not be construed as any limitation on the scope of the present invention. In practical applications, a plurality of steps (such as the Steps 310, 320, and 340) can be executed simultaneously or executed in different sequences according to the present invention. Such equivalent modifications or changes also do not depart from the spirit of the present invention.

After the motion condition of the target pixel is determined according to the present invention, the 2D or the 3D Y/C separation can be adopted correctly for the subsequent Y/C separating operation to perform suitable processing on the image and, thereby tile overall image quality can be improved.

Figure 4:
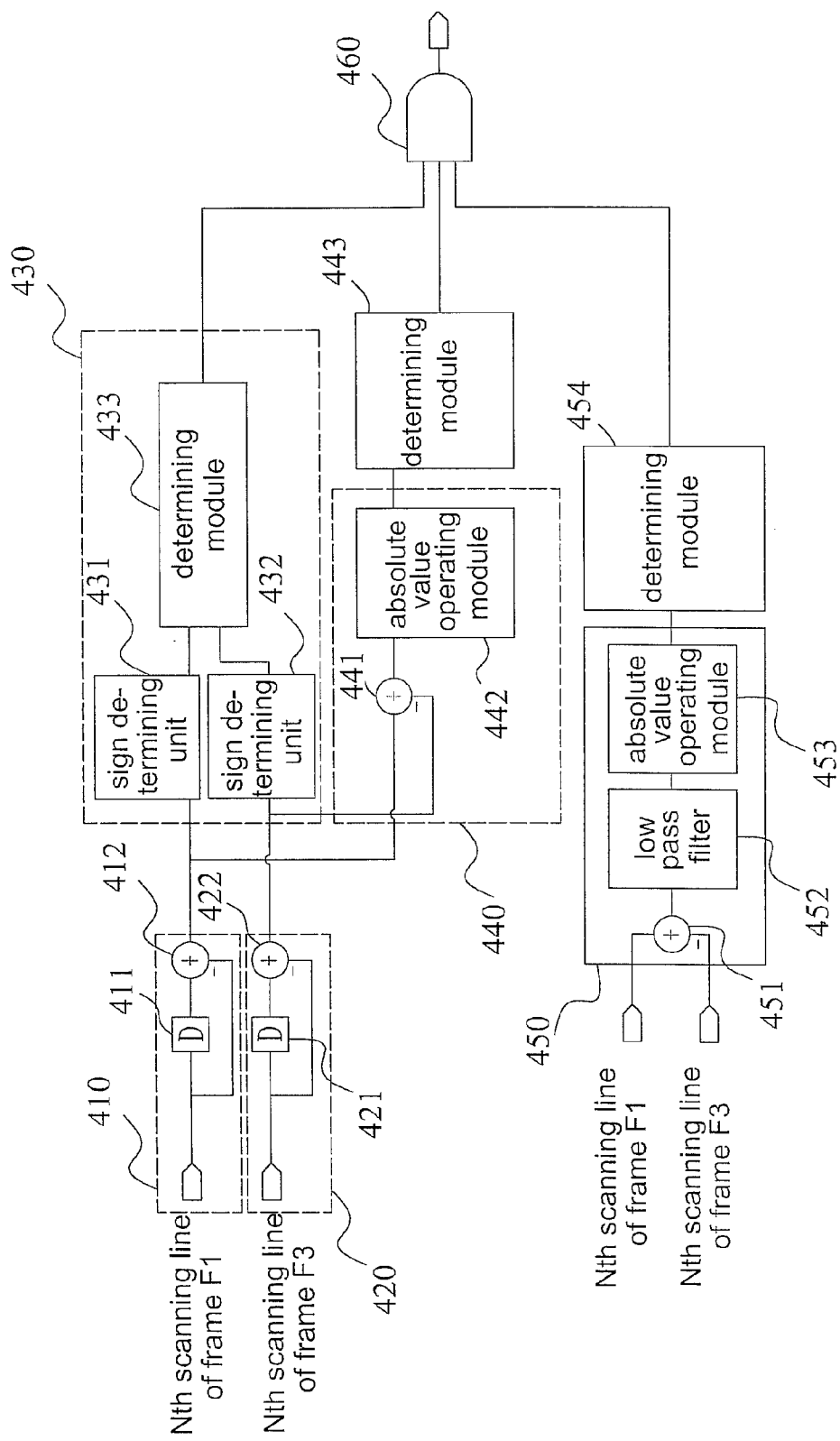
FIG. 4 shows a schematic diagram illustrating an image motion detecting device according to one embodiment of the present invention.

Please refer to FIG. 4 which shows a schematic diagram illustrating the image motion detecting device 400 according to one embodiment of the present invention. Please note that the image motion detecting device 400 is used to perform the above-mentioned Steps 300~360.

The pixel value difference calculating modules 410 and 420 for calculating the pixel value difference between the target pixel (the reference pixel) and the adjacent pixels include a delay unit 411, 421 and a subtracting unit 412, 422, respectively. The delay unit 411 performs a specific delay (that is, the timing difference between the target pixel and the neighboring pixels) on the target pixel. Hence, when receiving the neighboring pixel, the subtracting unit 412 can perform subtracting operation to calculate the pixel value difference of the target pixel and the neighboring pixel. As the operations of the delay unit 421 and the subtracting unit 422 are the same as those of the delay unit 411 and the subtracting unit 412, details will not be given hereafter.

Then, a same sign determining unit 430 receives the pixel value differences calculated by the pixel value difference calculating modules 410 and 420, separately, to determine if the two pixel value differences are of same sign. The same signal determining unit 430 includes two sign determining units 431, 432 for receiving the pixel value differences calculated by the pixel value difference calculating modules 410 and 420, respectively, and outputting the result, depending on whether the pixel value difference is larger than 0 or not. For example, the sign determining units 431, 432 output a signal of logic value 1 as the pixel value difference is larger than 0 but otherwise output logic 0. Then, the determining module 433 will determine either the two pixel value differences are of the same sign or not. For example, if the sign determining units 431, 432 output 1 (or 0) at the same time, the determining module 433 outputs a signal of logic value 1 but otherwise outputs logic 0 (corresponding to the Step 310).

The difference calculating module 440 is to calculate the difference between the two pixel value differences. The difference calculating module 440 includes a subtracting unit 441 and an absolute value operating unit 442. The subtracting unit 441 performs subtracting operation on the two pixel value differences and transmits the calculating result to the absolute value operating unit 442. The absolute value operating unit 442 performs absolute value operation to calculate the difference between the two pixel values.

Finally, the determining module 443 compares the above-mentioned difference to the predetermined threshold value Th1. As the difference is larger than the predetermined threshold value Th1, the determining module outputs logic 0. Otherwise, the determining module outputs logic 1 (corresponding to the Step 320).

On the other hand, the average difference calculating module 450 calculates the average value difference between the two above-mentioned segments. The average difference calculating module 450 includes a subtracting unit 451, a low-pass filter 452, and an absolute value operating unit 453.

The subtracting unit 451 performs subtracting operation on the two segments and transmits the operating result to the low-pass filter 452. According to this embodiment, the low-pass filter 452 can be considered as a weighting average operating unit (of course, it also can be a plain averaging unit) that performs weighting average operation on the operating result of the subtracting unit (that is, the subtracting result of every two pixels). Then, the absolute value operating unit 453 performs absolute value operation on the resulting value of the weighting average operation to calculate the difference between the two segments.

Finally, the determining module 454 compares the difference of the two segments to the predetermined threshold value Th2. As the difference is larger than the predetermined threshold value Th2, the determining module 454 outputs logic 1. Otherwise, the determining module 454 outputs logic 0 (corresponding to the Step 340).

All the logic values outputted from the determining modules 433, 443, and 454 are transmitted to a AND gate 460. Therefore, when all the outputs of the determining modules 433, 443, and 454 are of logic value 1, the output of the AND gate 460 is also logic value 1 which indicates that the target pixel is a still pixel (corresponding to the Step 350). Otherwise, the AND gate 460 outputs logic value 0 which indicates that the target pixel is a motion pixel (corresponding to the Step 360).

Although all the operations in the above-mentioned descriptions are performed by logic circuits, such structure is only one embodiment of the present invention and should not be construed as any limitation on the scope of the present invention. In practical applications, the above-mentioned logic can be implemented by a processor to execute a program code and such equivalent modifications or changes are also encompassed by the scope of the present invention.

Figure 5A:
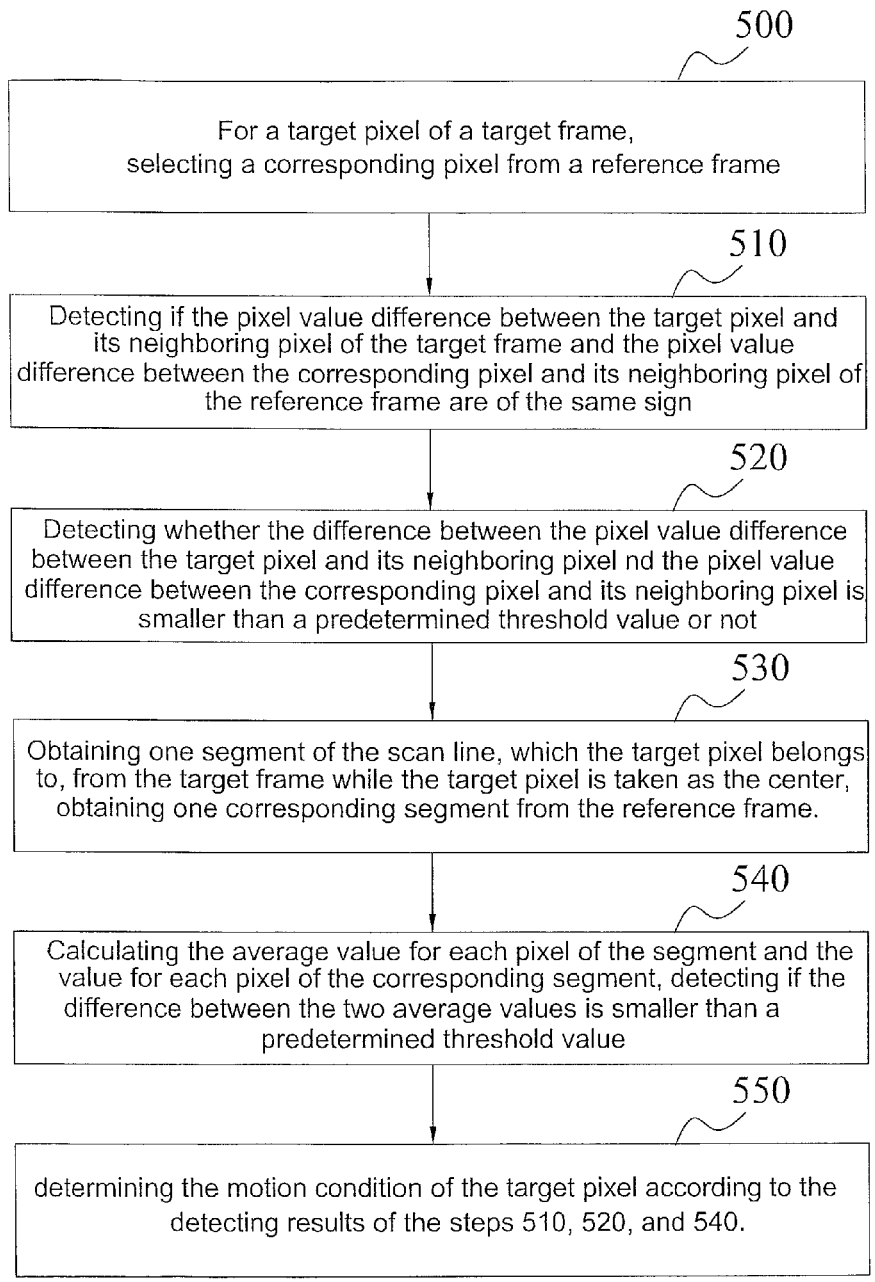
FIG. 5A shows a flow chart of the method according to another embodiment of the present invention.

Please refer to FIG. 5A which shows a flow chart illustrating the method according to another embodiment of the present invention. It comprises following steps:

Step 500: for a target pixel of a target frame, selecting a corresponding pixel from a reference frame. (The target frame and the reference frame according to one embodiment of the present invention are indicated by the frame F3 and the frame F1, respectively, shown in FIG. 1 but the present invention should not be limited to the specific construction and arrangement);

Step 510: detecting if the pixel value difference between the target pixel and its neighboring pixel of the target frame and the pixel value difference between the corresponding pixel and its neighboring pixel of the reference frame are of the same sign and then moving on to the Step 520;

Step 520: detecting whether the difference between the above-mentioned pixel value difference between the target pixel and its neighboring pixel and the pixel value difference between the corresponding pixel and its neighboring pixel is smaller than a predetermined threshold value or not, and then moving on to Step 530 if yes;

Step 530: selecting one segment of the scanning line, which the target pixel belongs to, from the target frame while the target pixel is taken as the center, selecting one corresponding segment from the reference frame, and then moving on to the Step 540;

Step 540: calculating the average value for each pixel of the segment and the average value for each pixel of the corresponding segment, detecting if the difference between the two average values is smaller than a predetermined threshold value, and then moving on to the Step 550;

Step 550: Determining the motion condition of the target pixel according to the detecting results of the steps 510, 520, and 540.

Figure 5B:
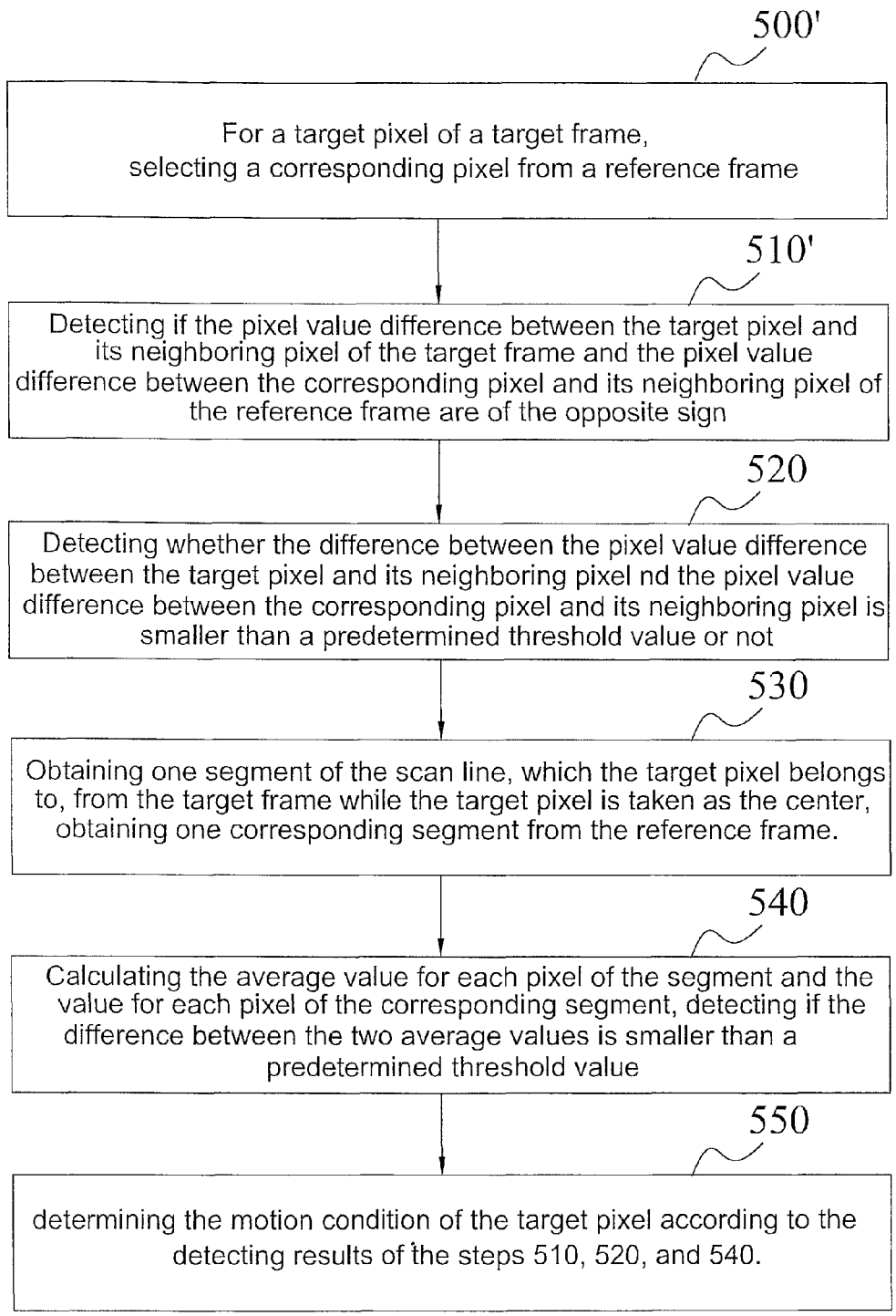
FIG. 5B shows a flow chart of the method according to another embodiment of the present invention.

Please refer to FIG. 5B, contrary to the above-mentioned embodiment, two adjacent frame are adopted as the target frame and the reference frame (not shown), the step 500 and step 510 will be modified as following:

Step 500': for a target pixel of a target frame, selecting a corresponding pixel from a reference frame.

Step 510': detecting if the pixel value difference between the target pixel and its neighboring pixel of the target frame and the pixel value difference between the corresponding pixel and its neighboring pixel of the reference frame are of the opposite sign and then moving on to the Step 520.

As the steps 500~540 are the same as the corresponding steps 300~340 of the above-mentioned embodiment of the present invention, details will not be repeated hereafter, for simplicity. Besides, the difference between the current embodiment and the above-mentioned embodiment is that the motion condition of the target pixel is determined according to the detecting result of the steps 510, 520, and 540 for the current embodiment of the present invention. Therefore, in the current embodiment of the present invention, the determination of the motion condition of the target pixel is not limited to determine either the target pixel is a still or a motion pixel. The motion condition being in between the still and the motion can also be determined in order to accommodate the usage of the subsequent Y/C separating operation. In other words, as tile Y/C separating operation employs the above-mentioned third type of separating operation (that is, the combinational 2D and 3D Y/C separation), the ratio between 2D and 3D can be selected by the motion condition determined according to the embodiment of the present invention.

In the above-mentioned disclosure, the scanning line which the target pixel belongs to and the corresponding scanning line of another reference frame are used to determine the motion condition of the target pixel. However, besides the target pixel, the same operating process can also be applied to a plurality of pixels adjacent to the target pixel to estimate the motion condition of the target pixel more precisely according to the motion conditions of the plurality of pixels.

For example, a 3*3 pixels region can be selected first where the target pixel is at the center of the region. Then, for every pixel (including the eight auxiliary pixels and a target pixel at the center) within the 3*3 pixels region, the motion conditions of the nine pixels are determined according to the above-mentioned method. The motion condition of the target pixel is estimated according to the motion conditions of the nine pixels. The accuracy of such separating operation can be more precise.

For example, the embodiment of the present invention can also be set up to determine the target pixel to be a still pixel only when the motion conditions of all the nine pixels are still. Or, the proportion of the 2D and the 3D Y/C separating operations is allocated according to the motion conditions of the nine pixels (such as: allocating the proportion of the 2D and the 3D Y/C separating operation to 4:5 when there are 5 pixels corresponding to still pixels and 4 pixels corresponding to motion pixels among the nine pixels). Such equivalent modifications or changes are also encompassed by the scope of the present invention.

The above-mentioned image region of 3*3 pixels is also just one embodiment of the present invention and should not be construed as any limitation on the scope of the invention. In practical applications, a larger region or other pixels that can be used as references can also be chosen according to the present invention. Such equivalent modifications or changes also do not depart from the spirit of the present invention.

Although the above-mentioned embodiments of the present invention are described by an NTSC image system, the present invention can also be applied to other image systems (such as the PAL image system). For example, as there is a 90-degree phase difference between the chrominance phases of the same scanning lines of adjacent two frames in the PAL image system, one chrominance period is completed by 4 frames. Therefore, two of above-mentioned flames (for example, two frames that are 3 frames apart) can also be used to perform the above-mentioned operation in the PAL image system.

Compared with the prior art, the image detecting method according to the present invention can better determine the motion condition of the image. Therefore, better motion information can be provided such that the following Y/C separation can be correctly performed according to the property of the image itself. This improves the image quality and the image processing efficiency.

Although the description of the present invention is by way of above-mentioned embodiments, it should not be construed as any limitation on the scope of the present invention. Various modifications or changes can be performed by those who are skilled in the art without deviating from the scope of the present invention.

What is claimed is:

1. A motion detecting method, comprising:
   receiving a composite signal including a target frame and a reference frame;
   for a target pixel of the target frame, selecting a first reference pixel from the target frame and selecting a second reference pixel and a third reference pixel from the reference frame, wherein the first reference pixel and the target pixel locate at a target scanning line, and the locations of the second reference pixel and the third reference pixel correspond to the locations of the target pixel and the first reference pixel, respectively;
   generating a first signal according to the pixel values of the target pixel and the first reference pixel;
   calculating a first difference between the target pixel and the first reference pixel and a second difference between the second reference pixel and the third reference pixel, and generating a second signal according to the first difference and the second difference;
   selecting a first plurality of pixels from the target frame and a second plurality of pixels from the reference frame, according to the target pixel, wherein the second plurality of pixels corresponds to the first plurality of pixels;
   generating a third signal according to the averaged value of the first plurality of pixels and the averaged value of the second plurality of pixels; and
   determining a motion condition of the target pixel according to the first signal, the second signal, and the third signal.

2. The method of claim 1, wherein the chrominance phase of the targets frame and the chrominance phase of the reference frame is substantially the same.

3. The method of claim 1, wherein the first reference pixel is a neighboring pixel of the target pixel.

4. The method of claim 3, wherein the second reference pixel locates on a position, corresponding to the target pixel, of the reference frame, and the third reference pixel locates on a position, corresponding to the first reference pixel, of the reference frame.

5. The method of claim 1, wherein the step of generating the first signal comprises:
   calculating a difference between the target pixel and the first reference pixel; and
   comparing the difference with a threshold to generate the first signal.

6. The method of claim 1, wherein the step of generating the second signal comprises:
   calculating a difference between the first difference and the second difference; and
   comparing the difference with a threshold to generate the second signal.

7. The motion detecting method of claim 1, wherein the step of generating the third signal comprises:
   calculating a difference between the averaged value of the first plurality of pixels and the averaged value of the second plurality of pixels; and
   comparing the difference with a predetermined threshold to generate the third signal.

8. The method of claim 1, wherein the first plurality of pixels is located in the target scanning line.

9. A motion detecting method comprising:
   receiving a composite signal including at least a target frame and a reference frame;
   for a target pixel of the target frame, selecting a first subset of a target scanning line, which the target pixel locates on, from the target frame and selecting a second subset from the reference frame, wherein the second subset corresponds to the first subset;
   comparing a pixel value variation condition of the first subset with a pixel value variation condition of the second subset to generate a first signal;
   comparing a weighted average of pixel values of the first subset with a weighted average of pixel values of the second subset to generate a second signal; and
   determining a motion condition of the target pixel according to the first signal and the second signal.

10. The method of claim 9, wherein the chrominance phase of the target frame and the chrominance phase of the reference frame are substantially the same.

11. The method of claim 9; wherein the step of generating the second signal comprises:
   calculating the weighted average of pixel values of the first subset;
   calculating the weighted average of pixel values of the second subset;
   calculating the difference between the weighted average of pixel values of the first subset and the weighted average of pixel values of the second subset; and
   comparing the difference with a predetermined threshold value to generate the second signal.

12. An apparatus for motion detection of a target pixel of a target scanning line in a target frame, comprising:
   a module for receiving a composite signal including a target frame and a reference frame;
   a module, operative for a target pixel of the target frame, operative to select a first reference pixel from the target frame and selecting a second reference pixel and a third reference pixel from the reference frame, wherein the first reference pixel and the target pixel locate at a target scanning line, and the locations of the second reference pixel and the third reference pixel correspond to the locations of the target pixel and the first reference pixel, respectively;
   a module for generating a first signal according to the pixel values of the target pixel and the first reference pixel;
   a calculating module for generating at least one calculating signal according to the target pixel, a plurality of first pixels including the first reference pixel in the target frame and a plurality of second pixels including the second reference pixel and the third reference pixel in a reference frame; and
   a determining module for determining a motion condition of the target pixel according to the at least one calculating signal, an averaged value of the plurality of first pixels and an averaged value of the plurality of second pixels;
   wherein the locations of the target pixel and the first reference pixel correspond to the locations of the second reference pixel and the third reference pixel, respectively, and the at least one calculating signal is related to the sign of the target pixel, the first pixels, and the second pixels.

13. The apparatus of claim 12, wherein the calculating module comprises:
   a first calculating unit for performing a difference operation on the target pixel and the first reference pixel to generate a first sign signal;
   a second calculating unit performing a difference operation on the second reference pixel and the third reference pixel to generate a second sign signal; and
   a first judging unit for generating a first calculating signal according to the first sign signal and the second sign signal.

14. The apparatus of claim 13, wherein tile calculating module comprises:
   a second judging unit for generating a second calculating signal according to an first value and a first threshold value;
   wherein the first value is the absolute value of the difference between a target difference from the first calculating unit and a reference difference from tile second calculating unit, the target difference is the difference of the target pixel and the First reference pixel, and the reference difference is the difference of the second reference pixel and the third reference pixel.

15. The apparatus of claim 14, wherein the calculating module comprises:
   a third calculating unit for receiving the weighted average of the target pixel and tile first pixels, and receiving the weighted average of the second pixels, and performing a difference operation on the weighted averages to generate a second value; and
   a third judging unit for generating a third calculating signal according to an absolute value of the second value and a second threshold value;
   wherein the locations of the target pixel and the first pixels corresponds to the locations of the second pixel.

16. The apparatus of claim 15, wherein the determining module determines the motion condition of the target pixel according to at least one of the first calculating signal, the second calculating signal or the third calculating signal.

17. The apparatus of claim 12, wherein the chrominance phase of the target frame and the reference frame are substantially the same if the target frame and the reference frame are separated by an odd number of frames.

18. The apparatus of claim 12, wherein the chrominance phase of the target frame and the reference frame are reversed to each other if the target frame and the reference frame are adjacent to each other or separated by an even number of frames.

19. The apparatus of claim 12, wherein the first reference pixel is a neighboring pixel of the target pixel.

20. The apparatus of claim 17, wherein the target pixel is not a still pixel if the first sign signal and tile second sign signal are different.

21. The apparatus of claim 18, wherein the target pixel is not a still pixel if the first sign signal and the second sign signal are the same.

22. The apparatus of claim 12, wherein the target pixel and the first pixels are located on a target scanning line of the target frame, the second pixels are located on a reference scanning line of the reference frame, and the location of the target scanning line of the target frame corresponds to the location of the reference scanning line of the reference frame.

* * * * *